(12) United States Patent
Chan et al.

(10) Patent No.: US 7,646,902 B2
(45) Date of Patent: Jan. 12, 2010

(54) COMPUTERIZED DETECTION OF BREAST CANCER ON DIGITAL TOMOSYNTHESIS MAMMOGRAMS

(75) Inventors: Heang-Ping Chan, Ann Arbor, MI (US); Jun Wei, Ann Arbor, MI (US); Sahiner Berkman, Ann Arbor, MI (US); Lubomir M. Hadjiiski, Ann Arbor, MI (US)

(73) Assignee: Regents of the University of Michigan, Ann Arbor, MI (US)

( * ) Notice: Subject to any disclaimer, the term of this patent is extended or adjusted under 35 U.S.C. 154(b) by 738 days.

(21) Appl. No.: 11/350,301

(22) Filed: Feb. 8, 2006

(65) Prior Publication Data

US 2006/0177125 A1 Aug. 10, 2006

Related U.S. Application Data

(60) Provisional application No. 60/650,923, filed on Feb. 8, 2005.

(51) Int. Cl.
*G06K 9/00* (2006.01)
(52) U.S. Cl. .................. 382/128; 382/131; 382/154
(58) Field of Classification Search ............... 382/100, 382/128–134, 219, 265, 294, 172, 199, 197, 382/256, 169, 194, 274, 196, 203, 270; 128/920–922; 378/19, 21, 37, 62, 46, 98.5, 98.6; 600/407, 600/425, 443; 345/32; 716/4; 365/39; 356/39; 377/10; 250/370.09; 324/300, 306, 312, 324/313, 320; 364/413
See application file for complete search history.

(56) References Cited

U.S. PATENT DOCUMENTS

| 6,748,044 | B2 * | 6/2004 | Sabol et al. ............... 378/4 |
| 6,748,047 | B2 * | 6/2004 | Gonzalez Trotter et al. ... 378/62 |
| 6,909,797 | B2 * | 6/2005 | Romsdahl et al. .......... 382/131 |
| 7,298,881 | B2 * | 11/2007 | Giger et al. ............... 382/128 |
| 2004/0052328 | A1 * | 3/2004 | Sabol et al. ............... 378/37 |
| 2005/0049497 | A1 * | 3/2005 | Krishnan et al. .......... 600/437 |
| 2005/0113681 | A1 * | 5/2005 | DeFreitas et al. .......... 600/426 |

* cited by examiner

*Primary Examiner*—Samir A. Ahmed
*Assistant Examiner*—Mehdi Rashidian
(74) *Attorney, Agent, or Firm*—Marshall, Gerstein & Borun LLP

(57) ABSTRACT

A method for using computer-aided diagnosis (CAD) for digital tomosynthesis mammograms (DTM) including retrieving a DTM image file having a plurality of DTM image slices; applying a three-dimensional gradient field analysis to the DTM image file to detect lesion candidates; identifying a volume of interest and locating its center at a location of high gradient convergence; segmenting the volume of interest by a three dimensional region growing method; extracting one or more three dimensional object characteristics from the object corresponding to the volume of interest, the three dimensional object characteristics being one of a morphological feature, a gray level feature, or a texture feature; and invoking a classifier to determine if the object corresponding to the volume of interest is a breast cancer lesion or normal breast tissue.

32 Claims, 8 Drawing Sheets

Fig. 6(a)  Fig. 6(b)

COMPUTERIZED DETECTION OF BREAST CANCER ON DIGITAL TOMOSYNTHESIS MAMMOGRAMS

CROSS-REFERENCE TO RELATED PATENT APPLICATIONS

This application claims benefit of U.S. Provisional Application Ser. No. 60/650,923, entitled "Computerized Detection Of Masses On digital Tomosynthesis Mammograms" filed Feb. 8, 2005, the disclosure of which is hereby incorporated by reference in its entirety for all purposes.

STATEMENT REGARDING FEDERALLY SPONSORED RESEARCH OR DEVELOPMENT

This invention was made with government support under Grant numbers CA091713 and CA095153 awarded by the National Institutes of Health (Department of Health and Human Services) and Grant number DAMD17-02-1-0214 awarded by the Army Medical Research and Materiel Command. The government has certain rights in the invention.

FIELD OF TECHNOLOGY

This relates generally to breast cancer detection and, more particularly, to a system and method for using computer-aided diagnosis (CAD) for Digital Tomosynthesis Mammograms (DTMs) for detection and characterization of breast lesions.

DESCRIPTION OF THE RELATED ART

Cancer is a serious and pervasive medical condition that has garnered much attention in the past 50 years. As a result there has and continues to be significant effort in the medical and scientific communities to reduce deaths resulting from cancer. Mammography is the most cost-effective screening method for early detection of breast cancer. However, mammographic sensitivity is often limited by the presence of overlapping dense fibroglandular tissue in the breast. The dense parenchyma reduces the conspicuity of the abnormalities, which constitutes one of the main causes of missed breast cancer. The advent of full field digital detectors offers opportunities to develop new techniques for improved imaging of dense breasts such as digital tomosynthesis, stereomammography, and breast computed tomography. These new techniques are still under development and their potential impacts on breast cancer detection remain to be investigated.

Digital tomosynthesis is based on the same principle as conventional tomography in diagnostic radiology which uses a screen-film system as the image receptor for imaging body parts at selected depths. In conventional tomography, a series of projection exposure is accumulated on the same film when the x-ray source is moved about a fulcrum while the screen-film system is moved in the opposite direction. A drawback of conventional tomography is that each tomogram can only image one plane at a selected depth in relatively sharp focus. If the exact depth of interest is not known in advance or the abnormality encompasses a range of depths, a tomogram at each depth will have to be acquired at separate imaging, thus costing additional dose and examination time.

With a digital detector, the series of projection exposure is readout as separate projection views at the different x-ray source locations. Tomographic slices focused at any depths of the imaged volume can then be generated with digital reconstruction techniques from the same series of projection images. Because of the wide dynamic range and the linear response of the digital detector, each of the projection images can be acquired with a fraction of the x-ray exposure used for a regular projection radiograph. The total dose required for digital tomosynthesis imaging may be kept at nearly the same or only slightly higher than that of a regular radiograph. Properly designed digital reconstruction techniques provide the additional advantage that the depth resolution of tomosynthesis is generally much higher than that of conventional tomography. Digital tomosynthesis thus makes tomography more practical to be applied to breast imaging in terms of radiation dose, examination time, and spatial resolution.

Digital breast tomosynthesis mammography is one of the promising methods that may reduce the camouflaging effects of dense tissue and improve mammographic sensitivity for breast cancer detection in dense breasts. DTM may also improve the accuracy in differentiation of malignant and benign breast lesions because the reduction of overlapping tissue allows the features of the lesions to be visualized or analyzed more reliably. Several research groups are developing digital tomosynthesis methods for reconstruction of tomographic slices from the series of projection images. A study is underway to compare DTM with conventional mammograms in breast cancer detection.

SUMMARY

Digital tomosynthesis mammography (DTM) is a promising new modality that has the potential to improve breast cancer detection, especially in dense breasts. However, the number of slices per breast may range from 30 to over 80, thus increasing the time required for interpretation. A computer-aided diagnosis (CAD) method and a system is disclosed that provides a second opinion to radiologists during their interpretation of DTMs. The disclosed CAD system uses a combination of computer vision techniques, including image enhancement, 3D gradient field analysis, 3D object segmentation, feature extraction, feature classification, to detect breast lesions on mammograms and to characterize it as malignant or benign. This is the first CAD system that uses 3D image processing techniques to detect and classify lesions in DTMs.

BRIEF DESCRIPTION OF DRAWINGS

FIG. 6(a) is a DTM slice intersecting a spiculated mass;

FIG. 6(b) is the segmented mass from FIG. 6(a) in the corresponding slice after 3D region growing segmentation;

DETAILED DESCRIPTION

Figure 1:
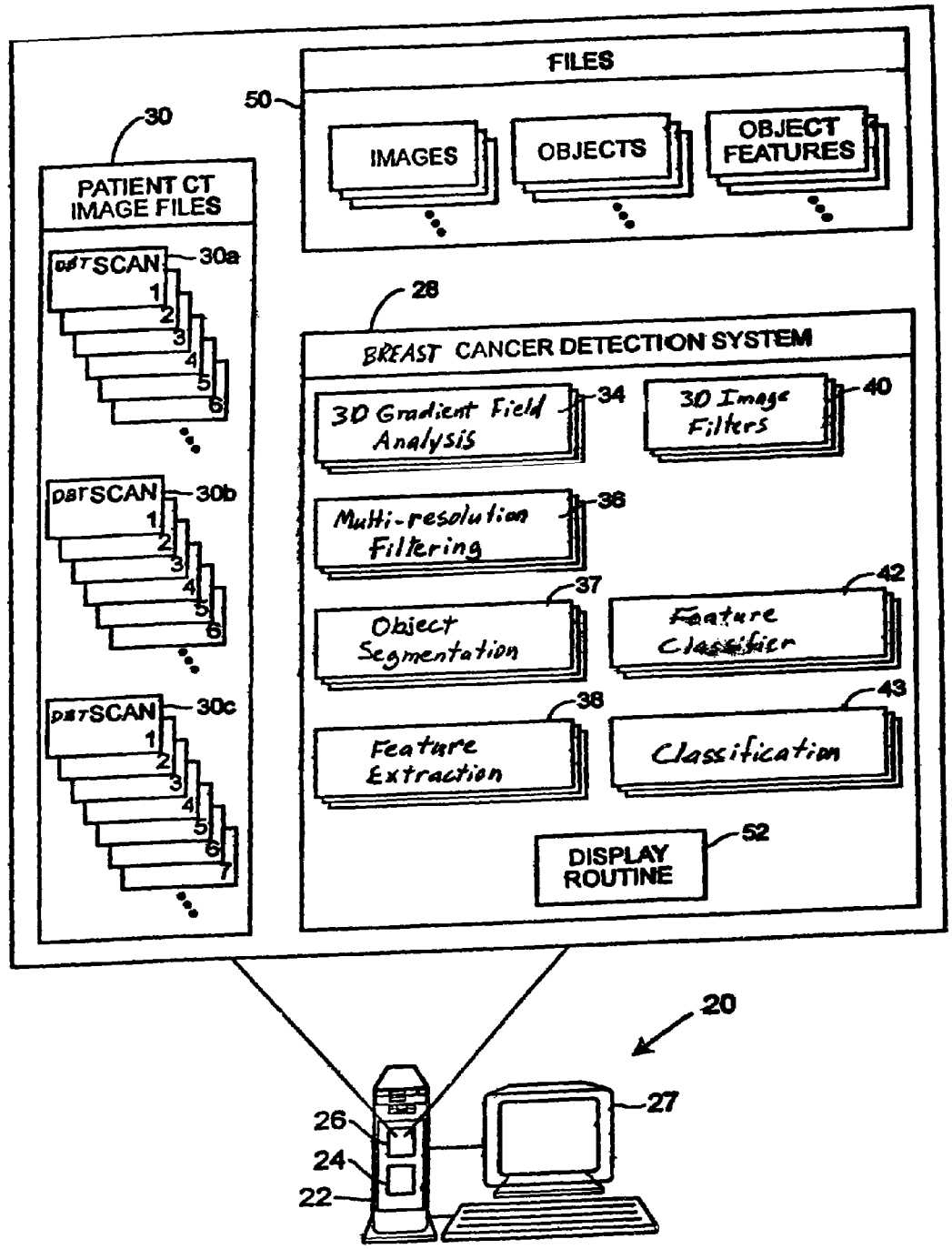
FIG. 1 is a block diagram of a computer aided diagnostic system that can be used to perform breast cancer screening and diagnosis based on a series of DTM images using one or more exams from a given patient.

Referring to FIG. 1, a computer aided diagnosis (CAD) system 20 that may be used to detect and diagnose breast cancers includes a computer 22 having a processor 24 and a memory 26 therein and having a display screen 27 associated therewith. As illustrated in an expanded view of the memory 26, a breast cancer detection and diagnostic system 28 in the form of, for example, a program written in computer implementable instructions or code, is stored in the memory 26 and is adapted to be executed on the processor 24 to perform processing on one or more sets of digital tomosynthesis mammography (DTM) images 30, which may also be stored in the computer memory 26. The DTM images 30 may include DTM images for any number of patients and may be entered into or delivered to the system 20 using any desired importation technique. Generally speaking, any number of sets of images 30a, 30b, 30c, etc. (called image files) can be stored in the memory 26 wherein each of the image files 30a, 30b, etc. includes numerous DTM scan images associated with a particular DTM scan of a particular patient. Thus, different ones of the images files 30a, 30b, etc. may be stored for different patients or for the same patient at different times. As noted above, each of the image files 30a, 30b, etc. includes a plurality of images therein corresponding to the different slices of information collected by a DTM imaging system during a particular DTM scan of a patient. The actual number of stored scan images in any of the image files 30a, 30b, etc. will vary depending on the size of the patient, the scanning image thickness, the type of DTM system used to produce the scanned images in the image file, etc. While the image files 30 are illustrated as stored in the computer memory 26, they may be stored in any other memory and be accessible to the computer 22 via any desired communication network, such as a dedicated or shared bus, a local area network (LAN), wide area network (WAN), the internet, etc.

As also illustrated in FIG. 1, the breast cancer detection and diagnostic system 28 includes a number of components or routines which may perform different steps or functionality in the process of analyzing one or more of the image files 30 to detect and/or diagnose breast cancers. As will be explained in more detail herein, the breast cancer detection and diagnostic system 28 may include 3D gradient field analysis routines 34, multi-resolution filtering routines 36, object segmentation routines 37, and feature extraction routines 38. To perform these routines 34-38, the breast cancer detection and diagnostic system 28 may also include one or more three dimension image processing filters 40, feature classification routines 42, classifiers 43, such as neural network analyzers, linear discriminant analyzers which use linear discriminant analysis routines to classify objects, support vector machines, rule based analyzers, including standard or crisp rule based analyzers and fuzzy logic rule based analyzers, etc., all of which may perform classification based on object features provided thereto. Of course other image processing routines and devices may be included within the system 28 as needed.

Still further, the CAD system 20 may include a set of files 50 that store information developed by the different routines 34-38 of the system 28. These files 50 may include temporary image files that are developed from one or more of the DTM images within an image file 30 and object files that identify or specify objects within the DTM images. The files 50 may also include one or more object files specifying the location and boundaries of objects that may be considered as lesion candidates, and object feature files specifying one or more features of each of these lesion candidates as determined by the feature classifying routines 42. Of course, other types of data may be stored in the different files 50 for use by the system 28 to detect and diagnose breast cancers from the DTM images of one or more of the image files 30.

Still further, the breast cancer detection and diagnostic system 28 may include a display program or routine 52 that provides one or more displays to a user, such as a radiologist, via, for example, the screen 27. Of course, the display routine 52 could provide a display of any desired information to a user via any other output device, such as a printer, via a personal data assistant (PDA) using wireless technology, etc.

During operation, the breast cancer detection and diagnostic system 28 operates on a specified one or ones of the image files 30a, 30b, etc. to detect and diagnose breast cancer lesions associated with the selected image file. After performing the detection and diagnostic functions, which will be described in more detail below, the system 28 may provide a display to a user, such as a radiologist, via the screen 27 or any other output mechanism, connected to or associated with the computer 22 indicating the results of the breast cancer detection and diagnostic process. Of course, the CAD system 20 may use any desired type of computer hardware and software, using any desired input and output devices to obtain DTM images and display information to a user and may take on any desired form other than that specifically illustrated in FIG. 1.

Computer-aided diagnosis (CAD) has been shown to improve breast cancer detection and characterization in mammography. Although a preliminary evaluation indicated that the breast lesions can be visualized in DTM images more easily than on conventional mammograms, the overall detection sensitivity and specificity of DTM in comparison with conventional mammograms remain to be investigated. With DTM, the number of reconstructed slices for each breast is very large. Even at 1-mm slice thickness, the number of slices per breast will range from about 30 to over 80. The time required for interpretation of a DTM case can be expected to be much greater than that for conventional mammograms. With the increase in radiologists' workload, the chance for oversight of subtle lesions may not be negligible. CAD will likely play a role in the interpretation of DTM as for conventional mammograms.

The DTM images may be acquired by a GE digital tomosynthesis mammography system. The system may have a flat panel CsI/a:Si detector with a pixel size of 0.1 mm×0.1 mm. The DTM system acquires projection views (PVs) of the compressed breast over a 50-degree arc in the mediolateral oblique (MLO) view. A total dose for the PVs was designed to be less than 1.5 times that of a single standard film mammogram. DTM slices are reconstructed at 1-mm slice spacing using an iterative maximum-likelihood algorithm.

Although a specific example of a DTM system is described here, DTM images may be acquired by DTM systems of other manufacturers and used as input to the CAD system 20. The digital detector can be made of other materials such as a selenium detector or a storage phosphor detector. The pixels of the detector can be any sizes acceptable for mammographic imaging, which may range from 0.05 mm×0.05 mm to 0.2 mm×0.2 mm. The PVs may be acquired with different parameters such as the angular range, number of PVs per breast, radiation dose, mammographic views. The DTM slices may be reconstructed at different pixel sizes or slice thickness.

DTM slices can be reconstructed using a variety of reconstruction algorithms including, but not limited to, iterative maximum-likelihood algorithms, filtered backprojection algorithms, backprojection algorithms, algebraic reconstruction techniques (ART), simultaneous ART, and simultaneous iterative reconstruction techniques (SIRT).

Figure 2:
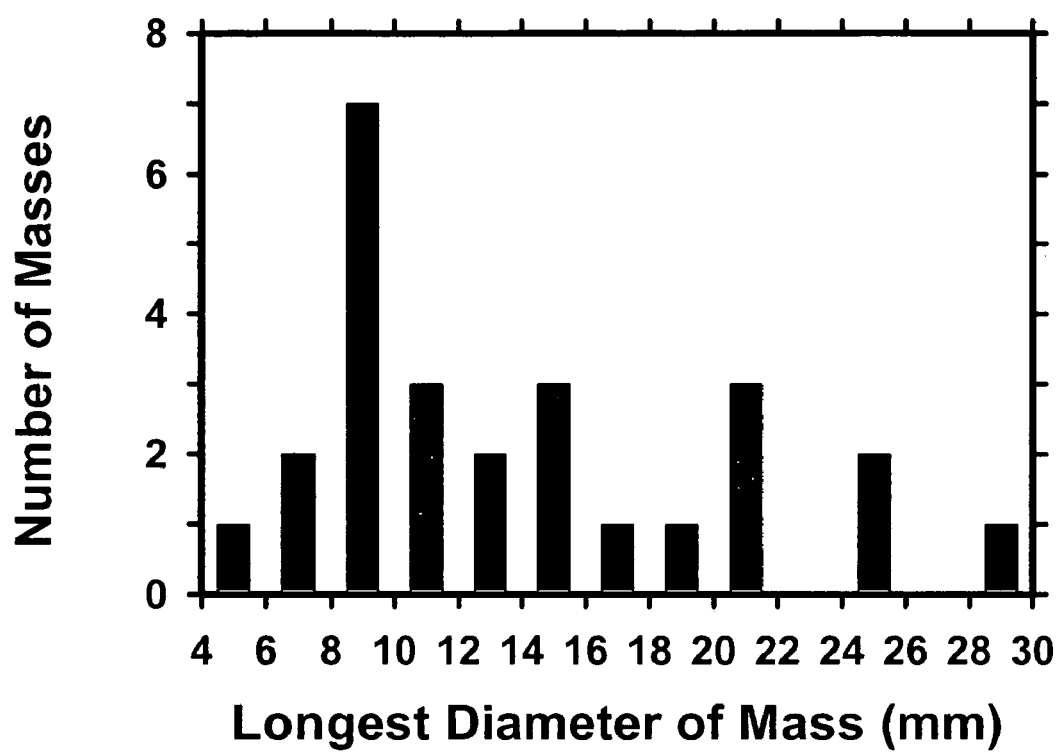
FIG. 2 is a graph illustrating a distribution of a longest diameter of 23 masses and 3 areas of architectural distortion estimated on a DTM slice intersecting a lesion approximately at its largest cross section.
Figure 3:
FIG. 3 is a graph illustrating a distribution of breast density in terms of BI-RADS category for 26 breasts estimated by an MQSA radiologist from conventional mammograms.

A case may consist of DTM slices of a single breast. In a preliminary study, 26 cases including 23 masses and 3 areas of architectural distortion were available. Thirteen of the masses and 2 of the architectural distortion were proven to be malignant by biopsy. The true location of the mass or the architectural distortion in each case was identified by a Mammography Quality Standards Act (MQSA) radiologist based on the diagnostic information. The longest diameter of the lesions ranged from 5.4 mm to 29.4 mm (mean=14.2 mm, median=12.1 mm) as estimated on the DTM slice intersecting the lesion approximately at its largest cross section. The distribution of the longest diameter of the masses or the areas of architectural distortion is shown in FIG. 2. The distribution of the breast density in terms of BI-RADS category for the 26 breasts as estimated by an MQSA radiologist from viewing the conventional screen-film mammograms is shown in FIG. 3.

Figure 4A:
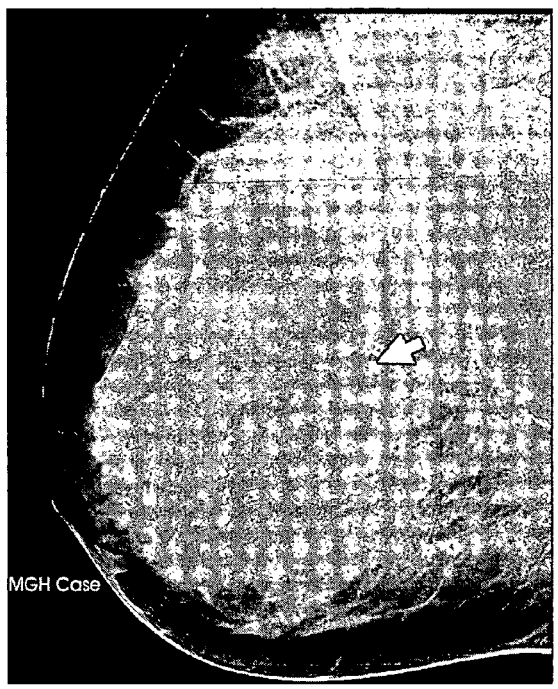
FIG. 4(a) is an example of a mass imaged on a DTM slice.
Figure 4B:
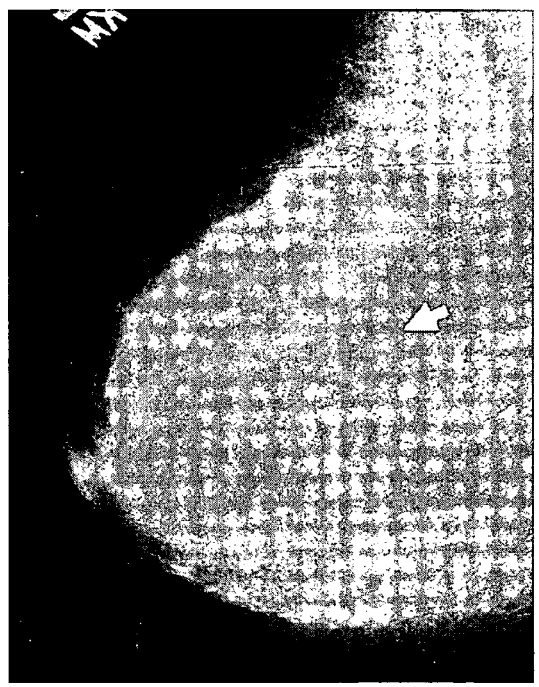
FIG. 4(b) is an example of a screen-film mammogram.

An example of a DTM slice intersecting a spiculated mass is shown in FIG. 4(*a*). The same mass imaged in a conventional screen-film mammogram of the same view is shown in FIG. 4(*b*) for comparison. The spicules of the mass are much more conspicuous in the DTM slice than in the mammogram, likely attributable to the reduced structured background in the DTM image.

Computerized Detection

Figure 5:
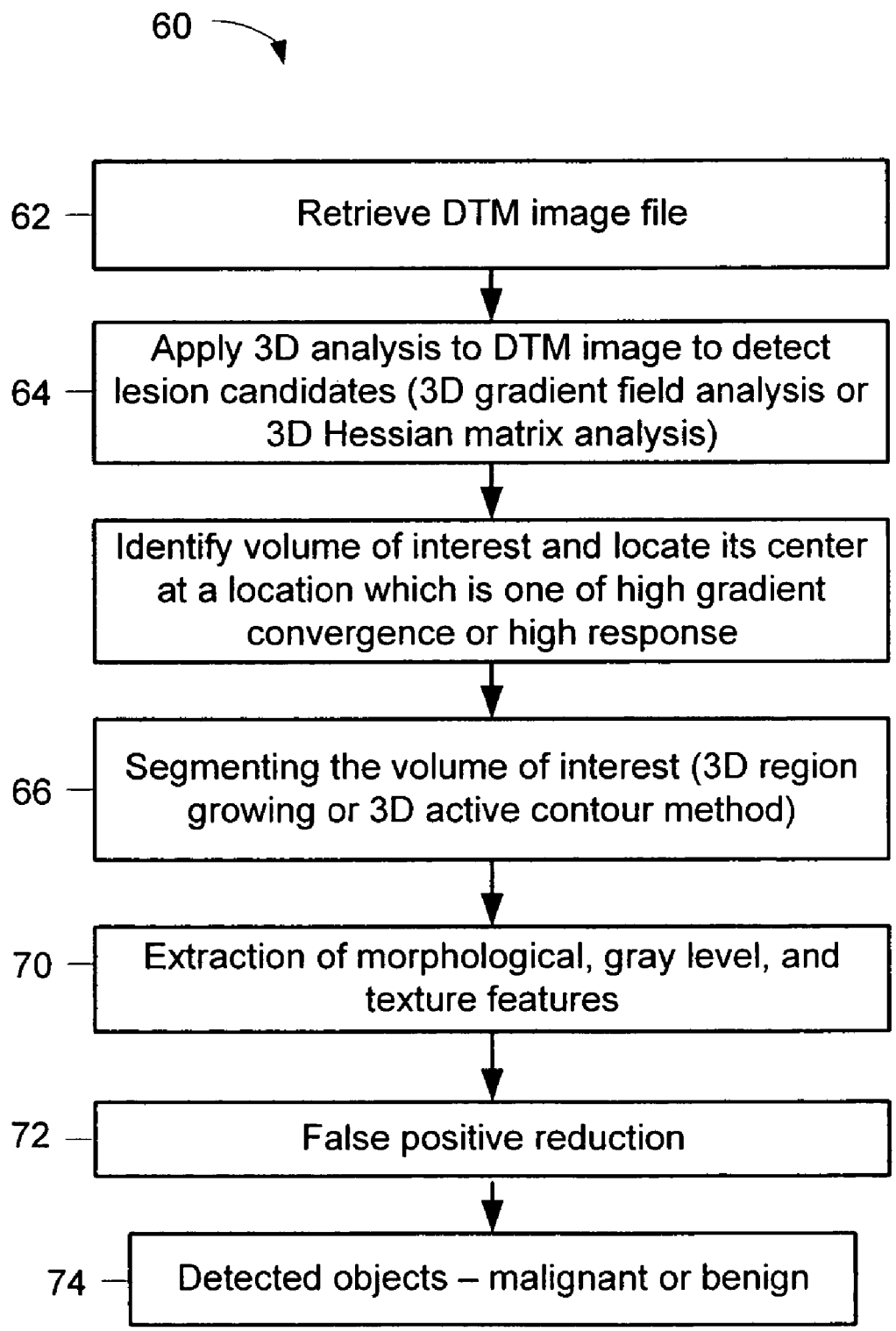
FIG. 5 is a flow chart illustrating a method of processing a set of DTM images for one or more patients to screen for lesion on DTM mammograms.
Figure 6C:
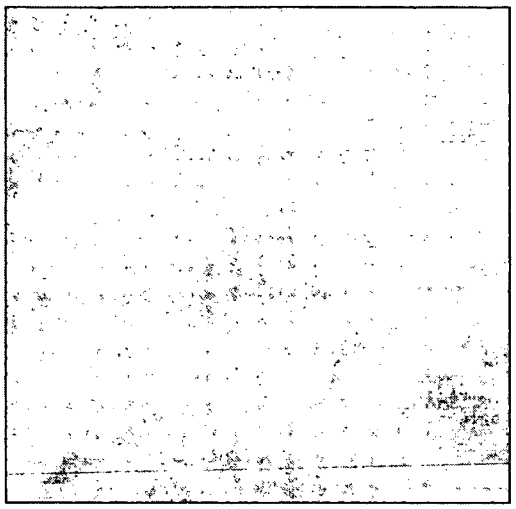
FIG. 6(c) illustrates a rubber-band straightening transform (RBST) image of a 60-pixel wide region around the mass from FIG. 6(a)
Figure 6C:
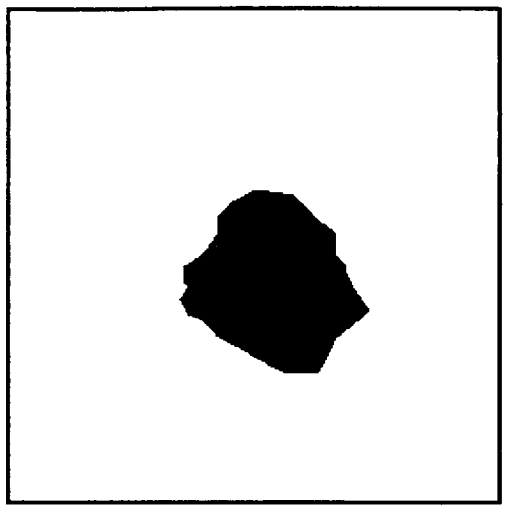
Figure 6C:
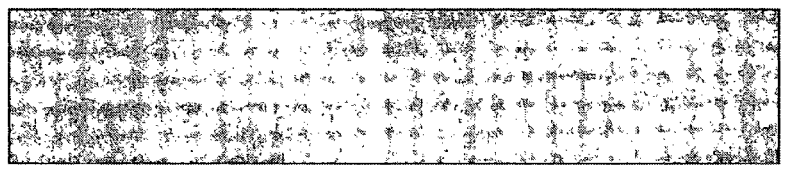
Figure 6D:
FIG. 6(d) illustrates a gradient image obtained by Sobel filtering of the RBST image from FIG. 6(c)

FIG. 5 depicts a flow chart 60 that illustrates a general method of performing breast cancer detection and diagnosis for a patient based on a set of DTM images for the patient as well as a method of determining whether the detected breast lesions are benign or malignant. The flow chart 60 of FIG. 5 may generally be implemented by software or firmware as the breast cancer detection and diagnostic system 28 of FIG. 1 if so desired. Generally speaking, the method of detecting breast cancer depicted by the flow chart 60 includes a series of steps 62-74 that are performed on each of the DTM images for a particular image file 30 of a patient to identify and classify the areas of interest on the DTM images.

The breast cancer detection CAD system 28 includes several major steps—prescreening, segmentation, feature extraction, false-positive (FP) reduction, as shown in the schematic in FIG. 5. For a given case, DTM slices containing the entire breast volume are input into the system for processing (block 62).

Prescreening:

In the prescreening step, the goal is to detect lesion candidates (block 64) by using the property that the breast lesions are generally denser and have higher gradient at the transition between the breast tissue background and the lesion. To achieve this goal, a three-dimensional (3D) gradient field analysis can be applied to the volumetric data set of each case as described below. Of course, variations of the method or the implementation to extract similar gradient convergence information are possible. To reduce noise in the gradient calculation, the image voxels may first be averaged to obtain a smoothed volumetric data set. The gradient field analysis is calculated in a spherical region about the size of a lesion, e.g., 5 to 10 mm in radius, centered at each voxel, $c(i)$, of the breast volume. The gradient vector at each smoothed voxel $v(j)$ in the spherical region is computed and the direction of the gradient vector is projected to the radial direction from the central voxel $c(i)$ to the voxel $v(j)$. The average gradient direction over a spherical shell of voxels at a radius, $R(k)$, of k voxels from $c(i)$ is calculated as the mean of the gradient directions over voxels on three adjacent spherical shells, e.g., $R(k-1)$, $R(k)$, and $R(k+1)$. Finally, the gradient field convergence at $c(i)$ is determined by computing some statistics, e.g., the maximum of the average gradient directions among all shells in the spherical region. The gradient field convergence calculation is performed over all voxels in the breast region, resulting in a 3D gradient field image.

An alternative method to detect lesion candidates is to apply 3D Hessian matrix analysis to the DTM volumetric data set. Hessian matrix has been described in the literature but has not been applied to DTM for lesion detection. Hessian matrix is calculated by convolution of the second derivatives of 3D Gaussian filters with the DTM data set. Multiscale Gaussian filters covering the size range of the lesions of interest will be applied. For each scale, a response function designed to enhance 3D spherical objects within a size range is calculated at each voxel. The response functions at different scales are combined by a maximum operation. The resulting response image depicts locations of potential lesions as locations of relatively high responses. The response that exceeds a selected threshold can then be labeled as potential lesions. These locations may be subjected to subsequent analysis, similar to that applied to the locations obtained by gradient field analysis, as described below. Of course, variations in the implementation of the Hessian matrix analysis are possible.

Segmentation:

Still referring to FIG. 5, a volume of interest (VOI) (e.g., 256×256×256 voxels) is then identified with its center placed at each location of high gradient convergence or high response. The object in each VOI is segmented by a 3D region growing method in which the location of high gradient convergence is used as the starting point and the object is allowed to grow across multiple slices (block 66). Region growing may be guided by the radial gradient magnitude. The growth of the object is terminated where the radial gradient reaches a threshold value adaptively selected for the local object. After region growing, all connected voxels constituting the object are labeled.

An alternative segmentation method is to use k-means clustering to group the voxels in the VOI into a lesion class and a background class. The largest connected object in the lesion class will be used as the initial region for a 3D active contour model or level set segmentation method. The search for object boundary by the 3D active contour model is guided by minimization of an energy function, which is a weighted sum of internal energy terms such as homogeneity energy, continuity energy, two-dimensional (2D) curvature energy, and 3D curvature energy, and external energy terms such as 2D gradient energy, 3D gradient energy, and balloon energy. The weights of the 3D active contour are optimized using a training set of DTM lesions.

Feature Extraction:

The 3D object characteristics are then extracted from the object (block 70). Three groups of features—morphological features, gray level features, and texture features—are extracted from the segmented object. The morphological features describe the shape of the object. They include, but are not limited to, the volume in terms of the number of voxels in the object, volume change before and after 3D morphological opening by a spherical element with a radius of several voxels, e.g., 5 voxels, the surface area, the maximum perimeter of the segmented object among all slices intersecting the object, and the longest diameter of the object. The compactness of the object is described in terms of the percentage overlap with a sphere of the same volume centered at the centroid of the object. The gray level features include, but are not limited to, the contrast of the object relative to the surrounding background, the minimum and the maximum gray levels, and the characteristics derived from the gray level histogram of the object such as the skewness, kurtosis, energy, and the entropy.

The texture features can be extracted either in 2D or 3D. One example of 2D texture feature extraction is described as follows. On each slice, the cross section of the 3D object is treated as an object in a 2D image. The rubber-band straightening transform (RBST) previously developed for analysis of masses on 2D mammograms is applied to the object. A region around the object margin, e.g., a band of 60 pixels wide, is transformed to a rectangular coordinate system. In the RBST image, the lesion boundary will be parallel to the long side, and the radially oriented spicules or textures are aligned and parallel to the short side, thus facilitating texture analysis. A gradient image of the transformed rectangular object margin is derived from Sobel filtering. Texture features can be extracted from the run length statistics (RLS) of the gradient image in both the horizontal and vertical directions. The texture features may include, but are not limited to, short runs emphasis, long runs emphasis, gray level nonuniformity, run length nonuniformity and run percentage. Any other type of texture features may also be extracted, such as spatial gray level dependence (SGLD) textures, gray level difference statistics (GLDS) textures, and the Laws textures. Detailed description of the RBST and the RLS and SGLD texture features for mammographic lesions is well known by those of ordinary skill in the art. For a 3D object in the DTM data set, each RLS texture feature is averaged over the corresponding feature values over slices containing the segmented object.

3D texture extraction methods can be considered to be an extension of a 2D method. For example, the lesion can be analyzed in three groups of planes: (1) along the reconstructed high-resolution DTM slices that are parallel to the detector plane, (2) a set of planes that cut through the centroid and the south-north poles, and (3) a set of planes that cut through the centroid and the east-west poles. On each plane, the cross section of the lesion will be similar to a lesion in 2D. The RBST is then applied to the band of pixels around the lesion boundary to transform it to a rectangular image. The texture in the RBST image can be further enhanced by, e.g., Sobel filtering or multi-resolution wavelet decomposition and reconstruction. Texture measures such as the RLS, the SGLD, the GLDS, and the Laws textures can then be extracted from the gray level statistics of the RBST image. The texture characteristics will be extracted from the planes over all orientations, described above. The corresponding texture measure extracted around the lesion can be averaged over all planes in each group to obtain an average texture measure over all directions around the lesion. Likewise, the RBST and texture feature extraction can be applied to the band of voxels inside the lesion boundary for further analysis of lesion characteristics.

The extracted features may incorporate object characteristics, including, but not limited to, spiculation features, boundary sharpness, and shape irregularity, that can be used by a trained classifier to estimate the likelihood that a lesion is malignant or benign. This may be a part of the output information displayed to a user.

Feature Classification and False Positive (FP) Reduction:

If a small data set is all that is available, a leave-one-case-out resampling technique can be used for training and testing the performance of the CAD system 20. If a large data set is available, the CAD system can be trained and tested with independent data sets. A classifier is trained to differentiate true lesions from false positive (FP) objects (block 72). Another classifier is trained to differentiate malignant and benign lesions. The classifier may include, but are not limit to, a linear discriminant analysis, a neural network, a support vector machine, rule-based classification, or fuzzy logic classification.

The free response receiver operating characteristic (FROC) analysis may be used to evaluate the test performance of the CAD system. A decision threshold is applied to the test discriminant score of each detected object. For an object that has a discriminant score above the threshold, the object may be compared to the true lesion location of that case. The object is considered to be true positive if the centroid of the true lesion marked by the radiologist falls within the volume of the object; otherwise, it is a false positive. For each decision threshold, the detection sensitivity and the average number of FPs per case is determined from the entire data set. The FROC curve is generated by varying the decision threshold over a range of values. After the CAD system is trained and tested to be useful, the CAD system can be applied to new patient cases as obtained in clinical practice. An appropriate decision threshold corresponding to a preferred sensitivity and specificity can be chosen along the FROC curve for the clinical application. The CAD system will detect the suspicious lesion locations and display these locations to the user. The CAD system will also estimate and display the likelihood of malignancy of the lesion to the user as an option.

FIGS. 6(*a*) and 6(*b*) show an example of a slice through a mass in a VOI and the mass boundary obtained by 3D region growing segmentation, respectively. An example of the RBST applied to the slice of the mass and the gradient image derived from the RBST image are shown in FIGS. 6(*c*) and 6(*d*). The spicules radiating from the mass are approximately in the vertical direction and the segmented boundary of the mass is transformed to a straight line, forming the upper edge of the rectangular RBST image.

Figure 7:
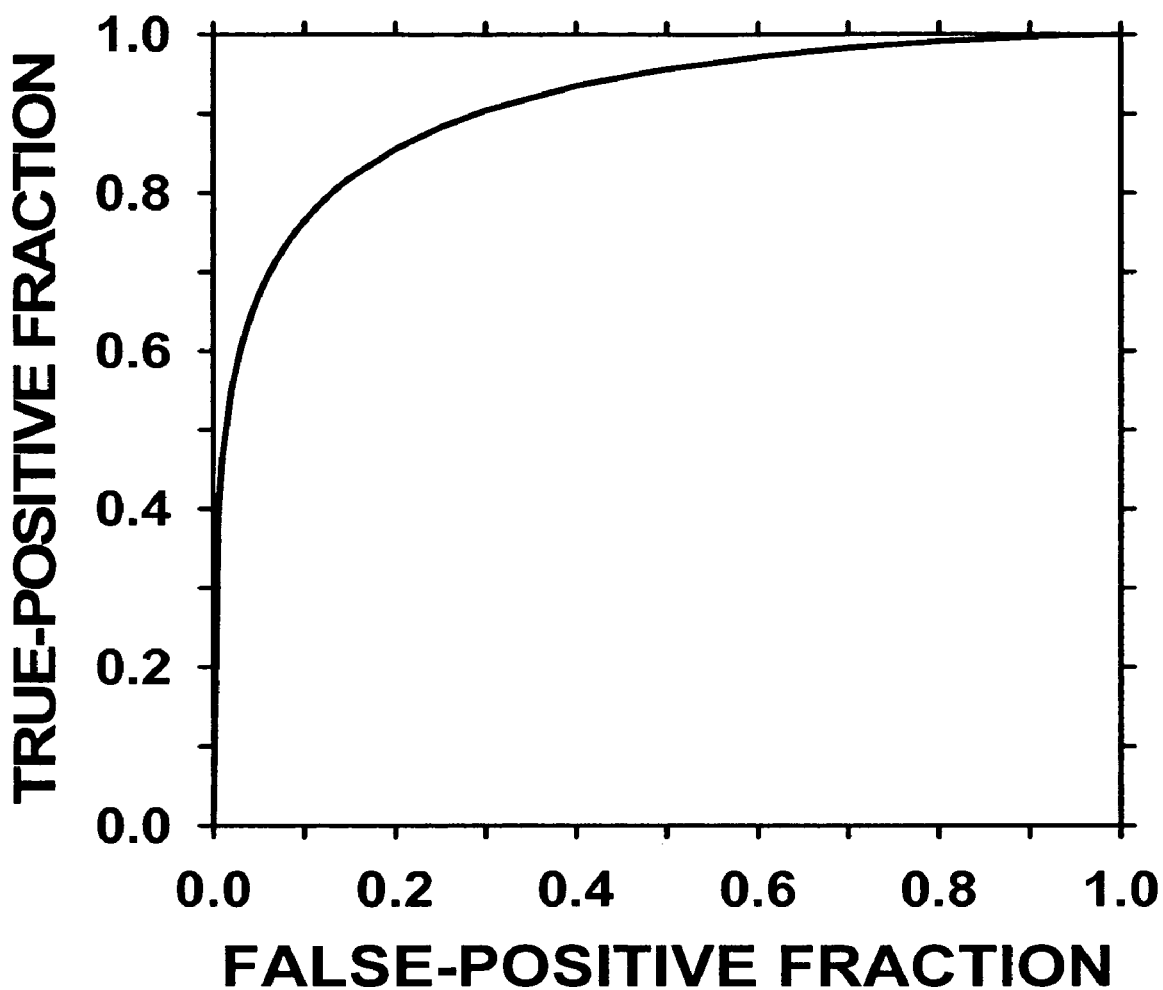
FIG. 7 is an ROC curve of a linear discriminant classifier obtained from leave-one-case-out testing.

For the design of the classifier for FP reduction, a stepwise or other feature selection procedure may select the most effective subset of features from the available feature pool, thus reducing the dimensionality of the feature space for the classifier. As an example, seven features may be selected from the available feature pool. The most often selected features are likely to include the contrast, minimum gray level, volume change before and after 3D morphological opening, maximum perimeter, compactness, and two RLS texture features—horizontal short runs emphasis and gray level nonuniformity. The performance of the classifier for differentiation of true and false lesions in the feature classification step of the CAD system 20 can be evaluated by ROC analysis. As an example, an ROC curve obtained from a linear discriminant analysis (LDA) classifier with stepwise feature selection is shown in FIG. 7. The LDA classifier was designed with the training subset in each of the leave-one-case-out cycle. The trained classifier was applied to the lesion candidates in the left-out case such that each object was assigned a discriminant score. The area under the ROC curve reached 0.87 with a standard deviation of 0.02.

Figure 8:
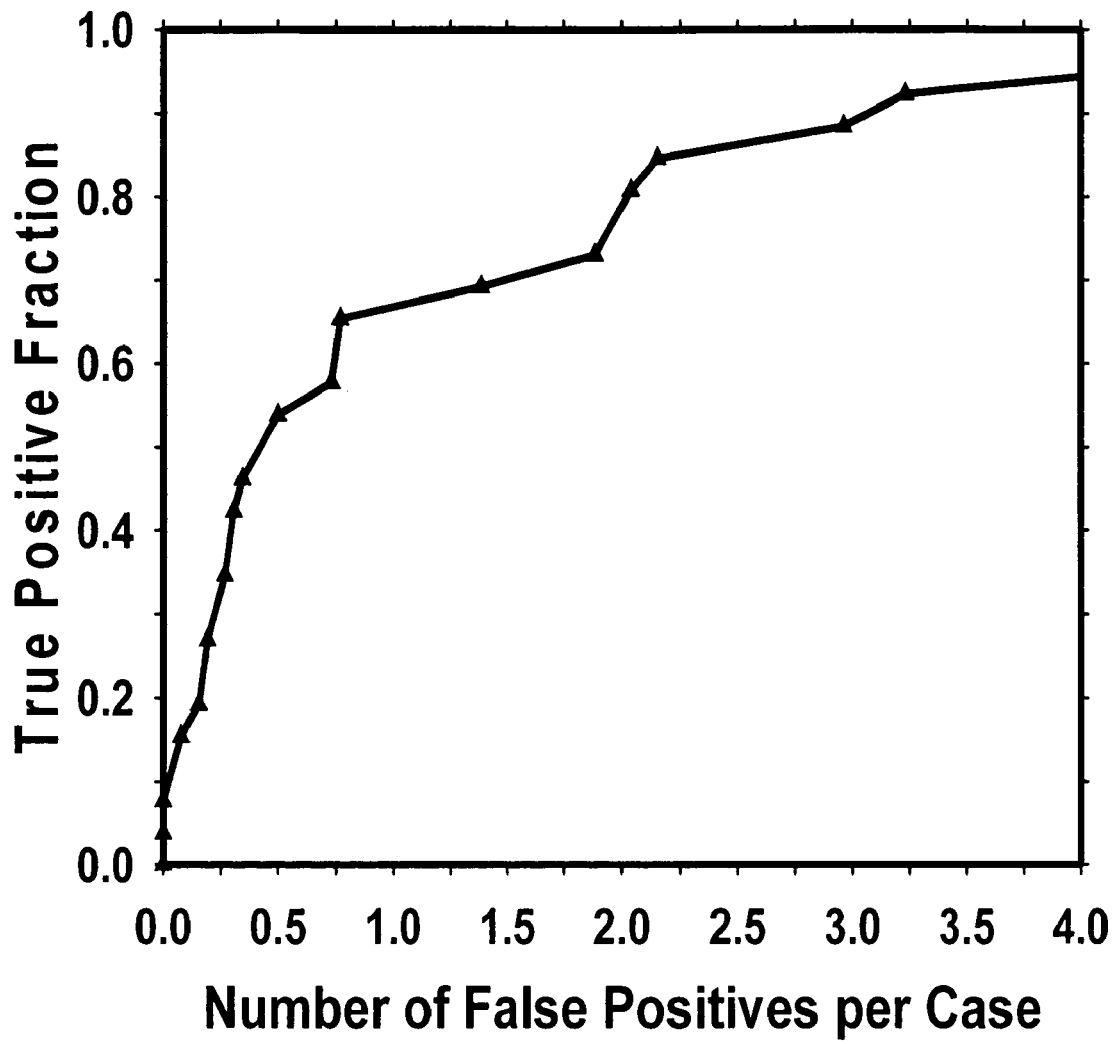
FIG. 8 is an FROC curve for test performance of a detection system for DTM mammograms.

During prescreening, most, if not all, of the masses and architectural distortions are typically detected. The overall test performance of the detection system after FP reduction for a data set of 26 cases is shown as the FROC curve in FIG. 8. The system has proven to achieve a sensitivity of 85% at 2.2 FPs/case and 80% at 2.0 FPs/case. This performance can further be improved if it is trained with a larger training set.

In DTM mammography, the structured background such as the dense fibroglandular tissue is suppressed in the reconstructed DTM slices. However, DTM is different from computed tomography in that the overlapping tissues are reduced but not totally eliminated. The tomosynthesis reconstruction leaves residues of the overlapping tissue on the DTM slices. Similarly, the shadow of a lesion can be seen in most slices even though the actual size of the lesion may only be a fraction of the breast thickness. In addition, the voxel dimension along the z-direction (i.e., the direction perpendicular to the slices) in the reconstructed slices may be several times larger than that in the x-y plane (the planes of the slices).

The boundary of an object in the z-direction is therefore not as well-defined as that on the x-y planes. The features extracted in 3D may have a strong directional dependence. For example, extracted texture features may be taken along the x-y planes and a 3D texture feature obtained by averaging the corresponding 2D texture values over slices containing the object. Alternatively, for 3D texture analysis, the texture features may be calculated in the shell of voxels surrounding the object or on the planes slicing through the object centroid from different directions.

Computerized Characterization

Computerized characterization of lesions on DTM images is intended as an aid to radiologists in making biopsy or follow-up recommendations in patient management. Classification between malignant and benign lesions may be performed as a separate step if the radiologist prefers to have an estimate of the likelihood of malignancy (LM) of a selected lesion during screening or diagnostic work-up. Alternatively, the computer may provide a malignancy rating for each suspicious lesion found by the computerized detection algorithm. Computerized lesion characterization has the general steps—preprocessing, segmentation, feature extraction, and feature classification. The specific computer vision techniques developed for characterization of breast lesions on DTMs are described below. Some of the feature extraction methods and features are similar to those developed for the lesion detection system. However, the feature classifier is designed to differentiate true lesions and false positives (normal breast tissue) in the detection system, whereas the feature classifier is trained to differentiate malignant and benign lesions in the characterization system.

Preprocessing:

A rectangular-prism shaped volume of interest (VOI) enclosing the lesion that has been either been identified manually by a radiologist or automatically detected by the computer, is extracted. The slice thickness may first be linearly interpolated to the same as the pixel size so that the voxels are isotropic cubes. Although DTM has reduced background compared with regular mammograms, dense tissue adjacent to a lesion is not uncommon. The background normal tissue structure is reduced by estimating the low frequency background gray level image from a shell of voxels at the periphery of the VOI. The gray level at a given voxel of the background image is obtained as a weighted average of the six gray level values of the voxels at the intersection between the normal from the voxel of interest to each of the six surfaces of the VOI. The weighting factor of each voxel value can be taken as the inverse of the length of the respective normal. The estimated background image is then subtracted from the lesion VOI.

Segmentation:

The segmentation method outlines the main body of the lesion. The lesion within the background-corrected VOI is segmented using either generalized k-means clustering followed by a 3D active contour model or a level set segmentation method, or 3D region growing with adaptive thresholding. In the first method, a set of pixels in 3D is grouped into a lesion class and a background class using the k-means technique. Clustering is performed iteratively until the cluster centers of the classes stabilize. The voxels grouped into the non-background class may or may not be connected. A 26-connectivity criterion is used to determine the various connected objects in the 3D space and the largest connected object in the lesion class is used as the initial region for a 3D active contour model, where the weights of the energy terms in the active contour model are optimized using a training set for the specific application of lesion segmentation on DTMs. In the second method, an adaptive threshold is determined as the maximum average gradient over all radial directions around the object being segmented. The threshold can also be made variable over the different radial directions by estimating a local threshold over a limited-angle conical section around a given radial direction.

Feature Extraction:

Morphological, gray-level, texture, and spiculation features are extracted. 3D morphological characteristics extracted from the segmented lesion boundary include, but are not limited to, the volume, the longest diameter, the surface-area-to-volume ratio, the sphericity, the eccentricity of a fitted ellipsoid, the normalized radial length from the object centroid, and the variance of the normalized radial length.

The gray level features for lesion characterization include, but are not limited to, the contrast of the object relative to the surrounding background, the minimum and the maximum gray levels, and the characteristics derived from the gray level histogram of the object such as the skewness, kurtosis, energy, and the entropy.

3D texture features may be extracted from the lesion analyzed in a number of planes, including: (1) along the reconstructed high-resolution DTM slices that are parallel to the detector plane, (2) a set of planes that cut through the centroid and the south-north poles, and (3) a set of planes that cut through the centroid and the east-west poles. On each plane, the cross section of the lesion is similar to a lesion in 2D. The RBST previously developed for analysis of masses on 2D mammograms is applied to the object. A region around the object margin, e.g., a band of 60 pixels wide, is transformed to a rectangular coordinate system. In the RBST image, the lesion boundary is parallel to the long side, and the radially oriented spicules or textures are aligned and parallel to the short side, thus facilitating texture analysis. The texture in the RBST image can be further enhanced by, e.g., Sobel filtering or multi-resolution wavelet decomposition and reconstruction. Texture measures such as the RLS, the SGLD matrices, the GLDS, and the Laws textures are extracted from gray level statistics of the RBST image. The texture characteristics may be extracted from the planes over all orientations, described above. The corresponding texture measure extracted around the lesion can be averaged over all planes in each group to obtain an average texture measure over all directions around the lesion.

An alternative to extract 3D texture features is to generalize the RBST to 3D, i.e., transforming a shell of voxels surrounding the lesion to a slab of rectangular voxels with the surface of the lesion transformed to a flat plane. The texture measures described above can then be generalized to 3D and extracted from the slab of voxels in all three dimensions.

Spiculation features are extracted both from the 2D planes described above, and also in 3D. For 2D spiculation analysis, a spiculation likelihood map around the lesion margin is calculated by the statistics of the gradient magnitudes and directions at each pixel. For a pixel $(i_c, j_c)$ on the mass boundary, a search region is defined as the set of all image pixels that i) lie outside the mass; ii) have a positive contrast; iii) are at a certain distance (e.g., less than 4 mm) from $(i_c, j_c)$; and iv) are within $\pm \pi/4$ of the normal to the mass contour at $(i_c, j_c)$. At each image pixel (i,j) in the search region, the obtuse angle θ between two lines is computed, where the first line is defined by the gradient direction at (i,j), and the second line joins the pixel (i,j) to the mass boundary pixel $(i_c, j_c)$. A method based on convolution with Gaussian derivatives may be used for computing the gradients. The spiculation measure at a mass boundary pixel $(i_c, j_c)$ is defined as the average value of θ in the search region. If the pixel $(i_c, j_c)$ lies on the path of a spiculation, then θ will be close to $\pi/2$ whenever the image pixel (i,j) is on the spiculation, and hence the mean of the spiculation measure will be high. The spiculation measure may be computed for a number of contours, where each contour is obtained by expanding the previous contour by one pixel at all pixels on the contour, and the first contour is given by the segmentation method. The resulting image in a band around the mass is referred to as the spiculation likelihood map. High values in the map indicate a high likelihood of the presence of spiculations. A threshold above which the voxel is considered to be part of a spicule is determined by training with case samples. The features in this map are used to classify lesions as spiculated and non-spiculated. Spiculation measures extracted from the spiculation likelihood image include, but are not limited to, the number, the density, the total area of spiculations, and the strength of the spiculation gradients to measure the degree of spiculation of the lesion. After extracting the spiculation measures from each plane, the corresponding measures can be averaged over all planes in the same group to derive 3D spiculation measures. These spiculation measures can be used directly, and in combination with morphological and texture features, as input features to the malignant-benign classifiers. Additional features for distinguishing fibrous tissue overlapping with the lesion from true spiculations include measures for gradient strengths and direction inside the lesion, and the estimate of the direction and the continuity of the structures from the inside to the outside of the lesion.

For 3D spiculation analysis, the spiculation likelihood map is generalized to 3D by calculating the statistics of the gradient magnitudes and directions in 3D space at each voxel in the lesion margin region. The gradient statistics at a point are calculated over a cone-shape region around the normal at that point. High values of gradient statistics in the lesion margin indicate possible presence of spiculations. A threshold above which the voxel is considered to be part of a spicule is determined by training with case samples. 3D spiculation measures such as number, density, and the proportion of voxels considered to be spicules relative to the total number of voxels in the lesion margin are derived from the 3D spiculation likelihood map. These features can then be used directly, or in combination with other morphological and texture features, as input predictor variables of classifiers for differentiation of malignant and benign lesions.

Feature Classification:

A classifier is trained to differentiate malignant and benign lesions based on the extracted features above. The classifier may include a linear discriminant analysis, a neural network, a support vector machine, rule-based classification, or fuzzy logic classification. For the design of the classifier, a stepwise or other feature selection procedure may select the most effective subset of features from the available feature pool, thus reducing the dimensionality of the feature space for the classifier.

The formulation of the classifiers is well known by those of ordinary skill in the art, but the combinations of segmentation and feature extraction techniques that are developed for the DTM images make the designed classifier specific for the CAD task described herein.

For DTM imaging, the raw data are acquired as projection view (PV) mammograms. The number of PVs will depend on the design of the DTM x-ray system. For example, a first generation GE prototype DTM system acquired 11 PVs. A second generation GE prototype DTM system acquired 21 PVs. The total dose of all PVs used about 1.5 times of the dose of a conventional mammogram. A PV is therefore noisier than a conventional mammogram. However, the PVs offer the advantage that a lesion will be projected at a slightly different angle and thus having somewhat different overlapping tissues on each view. A lesion that may be camouflaged by dense tissues on some views may become more conspicuous on other views. In addition, overlapping tissues that mimic lesions on some views may be less lesion-mimicking on other views. If a CAD system for lesion detection is applied to the PVs, the complementary information on the different PVs may be utilized to improve sensitivity and reduce FPs.

Furthermore, although the disclosed algorithm uses DTM slices reconstructed from 11 PVs using the iterative maximum-likelihood algorithm as input, image processing methods should not depend strongly on the reconstruction method or the number of PVs for generating the DTM slices as long as the image quality of the reconstructed slices are reasonable. The raw PV mammograms may also be directly used as input to the CAD system, with a chosen reconstruction method installed as a preprocessing step in the CAD system 20. Alternatively, the CAD system may first process the PV mammograms individually using 2D image processing techniques. The detected objects on the PVs may then be merged based on the extracted features. The merged information is used to differentiate true lesions or false positives.

When implemented, any of the software described herein may be stored in any computer readable memory such as on a magnetic disk, an optical disk, or other storage medium, in a RAM or ROM of a computer or processor, etc. Likewise, this software may be delivered to a user or a computer using any known or desired delivery method including, for example, on a computer readable disk or other transportable computer storage mechanism or over a communication channel such as a telephone line, the Internet, the World Wide Web, any other local area network, wide area network, or wireless network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

The invention claimed is:

1. A method for using computer-aided diagnosis (CAD) for digital tomosynthesis mammograms (DTM) comprising using a processor for:

retrieving a DTM image file having a plurality of DTM image slices;

applying a three-dimensional analysis to the DTM image file to detect lesion candidates defining a location;

identifying a volume of interest and locating its center at the location, which is one of high gradient convergence or high response;

segmenting an object corresponding to the volume of interest by a three dimensional method;

extracting one or more object characteristics from the object corresponding to the volume of interest, the object characteristics being one of a morphological feature, a gray level feature, or a texture feature; and invoking a classifier to determine if the object corresponding to the volume of interest is a breast lesion or normal breast tissue.

2. The method of claim 1, further comprising invoking the classifier to determine if the breast lesion is malignant or benign.

3. The method of claim 1, including applying a three-dimensional Hessian matrix analysis to the DTM image file to detect lesion candidates.

4. The method of claim 1, including applying a three-dimensional gradient field analysis to the DTM image file to detect lesion candidates; and averaging a plurality of image voxels to obtain a smoothed volumetric data set, wherein the volumetric data set corresponds to the DTM image file.

5. The method of claim 1, including applying a three-dimensional gradient field analysis to the DTM image file to detect lesion candidates; and calculating the three-dimensional gradient field analysis in a spherical region 5 to 10 mm in radius.

6. The method of claim 5, including determining a gradient vector at a smoothed voxel in the spherical region, and projecting the gradient vector to a radial direction from the center of the spherical region to the smoothed voxel.

7. The method of claim 1, including segmenting the object corresponding to the volume of interest by one of a three-dimensional active contour method or level set method.

8. The method of claim 1, including segmenting the object corresponding to the volume of interest by a three-dimensional growing method.

9. The method of claim 8, wherein segmenting the object corresponding to the volume of interest includes using the location of high gradient convergence as a starting point and allowing the object corresponding to the volume of interest to grow across at least a portion of the plurality of DTM image slices in the DTM image file.

10. The method of claim 8, including guiding the three-dimensional region growing method by a radial gradient magnitude.

11. The method of claim 10, including terminating the growth of the object corresponding to the volume of interest where the radial gradient reaches a threshold value.

12. The method of claim 1, including extracting a morphological feature from the object corresponding to the volume of interest, wherein the morphological feature is selected from the group of morphological features consisting of: a volume of the object, a volume change before and after three-dimensional opening by a spherical element with a predetermined voxel radius, a surface area of the object, a maximum perimeter of the object among all of the DTM image slices in the DTM image file intersecting the object, a longest diameter of the object, and a compactness of the object.

13. The method of claim 1, including extracting a gray level feature from the object corresponding to the volume of interest, wherein the gray level feature is selected from the group of gray level features consisting of: a contrast of the object relative to the surrounding background of the object, a minimum gray level, a maximum gray level, a skewness characteristic, a kurtosis characteristic, an energy characteristic, and an entropy characteristic.

14. The method of claim 1, including extracting one or more object characteristics from the object corresponding to the volume of interest, wherein the object characteristic is one of a spiculation feature, a boundary sharpness, or a shape irregularity.

15. A method for using computer-aided diagnosis (CAD) for digital tomosynthesis mammograms (DTM) comprising using a processor for:

applying a pre-screening analysis to a DTM image file to detect a potential breast cancer lesion, the DTM image file including a plurality of DTM image slices;

identifying a volume of interest;

segmenting the volume of interest by a three dimensional growing method by using one of a location of high gradient convergence or high response as a starting point and allowing an object corresponding to the volume of interest to grow across at least a portion of the plurality of DTM image slices in the DTM image file;

extracting a morphological feature from the object corresponding to the volume of interest, wherein the morphological feature is selected from the group of morphological features consisting of: a volume of the object, a volume change before and after three-dimensional opening by a spherical element with a predetermined voxel radius, a surface area of the object, a maximum perimeter of the object among all of the DTM image slices in the DTM image file intersecting the object, a longest diameter of the object, and a compactness of the object; and extracting a gray level feature from the object corresponding to the volume of interest, wherein the gray level feature is selected from the group of gray level features consisting of: a contrast of the object relative to the surrounding background of the object, a minimum gray level, a maximum gray level, a skewness characteristic, a kurtosis characteristic, an energy characteristic, and an entropy characteristic.

16. The method of claim 15, including invoking a classifier to determine if the object corresponding to the volume of interest is a breast cancer lesion.

17. The method of claim 16, wherein if the classifier determines that the object corresponding to the volume of interest is a breast lesion, invoking a classifier to determine if the lesion is malignant or benign.

18. The method of claim 15, including extracting a texture feature from the object corresponding to the volume of interest, wherein the texture feature is extracted from the lesion analyzed in a number of planes, including one or more of the following planes: (1) along the reconstructed high-resolution DTM slices that are parallel to the detector plane, (2) a set of planes that cut through the centroid and the south-north poles, and (3) a set of planes that cut through the centroid and the east-west poles; and the texture feature is selected from the group of texture measures consisting of: run-length statistics textures, spatial gray level dependence textures, gray level dependence statistics texture, or Laws textures.

19. The method of claim 15, including averaging a plurality of image voxels to obtain a smoothed volumetric data set, wherein the volumetric data set corresponds to the DTM image file.

20. The method of claim 15, including applying a three-dimensional Hessian matrix analysis to the DTM image file to detect lesion candidates.

21. The method of claim 15, including applying a three-dimensional gradient field analysis to the DTM image file to detect lesion candidates.

22. The method of claim 21, including determining a gradient vector at a smoothed voxel in a spherical region, and projecting the gradient vector to a radial direction from the center of the spherical region to the smoothed voxel.

23. The method of claim 22, including determining a gradient field convergence to produce a three-dimensional gradient field image.

24. The method of claim 15, including segmenting the volume of interest by one of a three-dimensional active contour method or level set method.

25. The method of claim 15, including segmenting the volume of interest by a three-dimensional growing method.

26. The method of claim 25, wherein segmenting the volume of interest includes using the location of high gradient convergence of high response as a starting point and allowing the object corresponding to the volume of interest to grow across at least a portion of the plurality of DTM image slices in the DTM image file.

27. A method for identifying a breast cancer lesion comprising using a processor for:
    using a digital tomosynthesis mammogram (DTM) image file having a plurality of DTM image slices;
    applying a computerized three-dimensional analysis to the DTM image file to detect a potential breast cancer lesion;
    averaging a plurality of image voxels to obtain a smoothed volumetric data set, wherein the volumetric data set corresponds to the DTM image file;
    Identifying a volume of interest;
    segmenting the volume of interest extracting one or more object characteristics from the object corresponding to the volume of interest, the object characteristics being one of a morphological feature, a gray level feature, a texture feature, a spiculation feature, a boundary sharpness, or a shape irregularity;
    invoking a first classifier to determine if the object corresponding to the volume of interest is a breast cancer lesion or normal breast tissue; and
    invoking a second classifier to determine if the lesion is malignant or benign if the first classifier determines that the object corresponding to the volume of interest is a breast lesion.

28. The method of claim 27, including applying one of a three-dimensional Hessian matrix analysis or a three-dimensional gradient field analysis to the DTM image file to detect lesion candidates.

29. The method of claim 27, including invoking a feature selection method to select the most effective features and reduce the dimensionality of the feature space for the classifier.

30. A method for determining whether a volume of interest in a digital tomosynthesis mammogram (DTM) image contains a malignant or benign lesion comprising using a processor for:
    using a background correction filtering algorithm for reducing dense tissue adjacent to a lesion in a volume of interest to estimate a low frequency background gray level image from a shell of voxels at a periphery of the volume of interest;
    segmenting the lesion in the volume of interest;
    extracting morphological, gray-level, texture, and spiculation features from the lesion and its segmented boundaries;
    invoking a classifier to determine at least one of whether the lesion in the volume of interest is malignant or benign, or an estimate of the lesion's likelihood of malignancy.

31. The method of claim 30, including segmenting the lesion using a k-means clustering algorithm.

32. The method of claim 31, including using a 3D active contour segmentation method that uses a K-means segmentation result as the initial contour.

* * * * *